United States Patent
Contavalli et al.

(10) Patent No.: US 9,325,564 B1
(45) Date of Patent: Apr. 26, 2016

(54) GRE TUNNELS TO RESILIENTLY MOVE COMPLEX CONTROL LOGIC OFF OF HARDWARE DEVICES

(71) Applicant: Google Inc., Mountain View, CA (US)

(72) Inventors: Carlo Contavalli, Millbrae, CA (US); Daniel Eugene Eisenbud, San Francisco, CA (US)

(73) Assignee: Google Inc., Mountain View, CA (US)

( * ) Notice: Subject to any disclaimer, the term of this patent is extended or adjusted under 35 U.S.C. 154(b) by 233 days.

(21) Appl. No.: 13/773,164

(22) Filed: Feb. 21, 2013

(51) Int. Cl.
- *G06F 15/173* (2006.01)
- *H04L 12/24* (2006.01)
- *H04L 29/12* (2006.01)
- *H04L 12/26* (2006.01)

(52) U.S. Cl.
CPC .......... *H04L 41/00* (2013.01); *H04L 29/12009* (2013.01); *H04L 43/026* (2013.01); *H04L 43/04* (2013.01); *H04L 43/10* (2013.01)

(58) Field of Classification Search
USPC ................... 709/223, 224; 370/392, 241, 248
See application file for complete search history.

(56) References Cited

U.S. PATENT DOCUMENTS

| | | | |
|---|---|---|---|
| 7,047,280 B2 | 5/2006 | Hall et al. | |
| 7,808,919 B2 * | 10/2010 | Nadeau et al. | 370/248 |
| 8,743,735 B1 | 6/2014 | Bershteyn et al. | |
| 8,837,300 B2 * | 9/2014 | Nedeltchev et al. | 370/241 |
| 8,885,650 B2 | 11/2014 | Tian | |
| 9,106,520 B2 | 8/2015 | Scott et al. | |
| 2002/0013848 A1 * | 1/2002 | Rene Salle | 709/226 |
| 2004/0030752 A1 | 2/2004 | Selgas et al. | |
| 2009/0238084 A1 * | 9/2009 | Nadeau et al. | 370/248 |
| 2013/0322258 A1 * | 12/2013 | Nedeltchev et al. | 370/241 |

* cited by examiner

*Primary Examiner* — Kyung H Shin
(74) *Attorney, Agent, or Firm* — Foley & Lardner LLP; Edward A. Gordon

(57) ABSTRACT

A forwarding device, such as a router, in a network may communicate with a service device according to a networking protocol. According to exemplary embodiments, logic for communicating according to the networking protocol may be relocated from the forwarding device to one or more remote controllers. The remote controllers may encapsulate networking messages and forward the networking messages to the forwarding device using a tunnel, thereby allowing the messages to follow the same path through the network as the messages would have followed if the messages had originated at the forwarding device. Accordingly, the forwarding device can be made simpler, updates to the networking protocol or remote controllers may be made without ceasing operations at the forwarding device, errors in the network may be quickly diagnosed, and a backup remote controller may take responsibility for communications in the network if a primary controller is rendered inoperable.

20 Claims, 7 Drawing Sheets

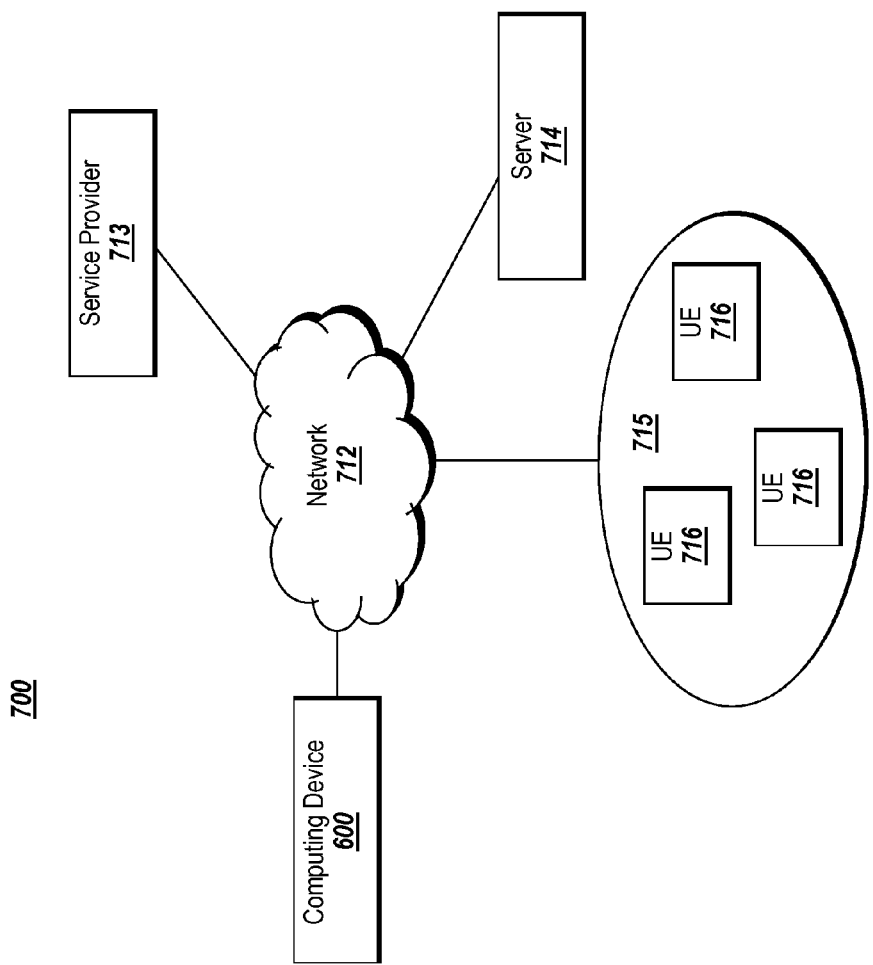

GRE TUNNELS TO RESILIENTLY MOVE COMPLEX CONTROL LOGIC OFF OF HARDWARE DEVICES

BACKGROUND

Communication networks provide an environment that allows information to be sent from a source device to a destination device. Typically, the information is not transmitted from the source device directly to the destination device. Instead, the information is typically transmitted to intermediate devices along a route from the source device to the destination device. Therefore, communication networks may include forwarding devices, such as routers, for determining the route to be taken by the information and/or forwarding the information from one location to another. The forwarding devices may forward the information from a source device to a further intermediate location (e.g., another forwarding device which is closer to the destination device), or may forward the information directly to the destination device.

The transmission of information in the communication network may be governed by a networking protocol that defines logic for determining (among other things) which paths are used for transmitting information in the network. The logic may make use, and specify the rules for creating, policies and routing tables that describe how to implement the paths. The networking protocol may describe how forwarding decisions are made, how information transmitted in the network should be formatted, and how information in the network should be addressed, among other possibilities. Conventional forwarding devices are programmed with the networking protocol so that the forwarding devices may properly route and format information traveling through the network.

SUMMARY

Because conventional forwarding devices are programmed with support for (or an implementation of) the networking protocol, the forwarding devices are more complex (due to the addition of extra memory and processing power for running the networking protocol) than the forwarding devices would otherwise need to be if the forwarding devices were limited to their primary responsibility of forwarding messages. Furthermore, if a network administrator desires to make updates or changes to the networking protocol, the forwarding device may need to be taken offline while the updates or changes are made. This may require that network traffic be routed through a different forwarding device (potentially increasing latency in the network) or halted entirely until the forwarding device can be restored. Still further, a failure of the networking protocol logic may cause a failure of the forwarding device, thus removing the network's ability to both generate networking protocol messages and to forward information.

To address these and other issues, according to exemplary embodiments logic for communicating according to the networking protocol may be implemented at one or more remote controllers, rather than at the forwarding device. Accordingly, the forwarding device can be made simpler because the forwarding device does not need additional memory, processing power, and logic to implement or support the networking protocol. Furthermore, updates to the networking protocol may be made without ceasing operations at the forwarding device because the updates can be made to the remote controller without disconnecting the forwarding device. Backup remote controllers may also take responsibility for networking protocol communications if a primary controller is rendered inoperable.

According to an exemplary embodiment, a remote controller may connect to a forwarding device in a network. The connecting may be effected through the use of a tunnel, such as a Generic Routing Encapsulation (GRE) tunnel. Using a tunnel (e.g., a GRE tunnel), the remote controller may act on behalf of the forwarding device, as if the remote controller were the forwarding device.

The tunnel may be generated using tunneling logic which causes the message to follow a same path to a destination device as messages that originate at the forwarding device. Because the message follows the same path to the destination device, transmission errors related to the sending of the encapsulating message can be identified. Therefore, network errors may be diagnosed by the forwarding device and/or by the remote controller.

The remote controller may generate a message relating to a networking protocol used in the network, such as the Border Gateway Protocol (BGP). The forwarding device may not be programmed with logic relating to the networking protocol. The message may include an identifier identifying a sender of the message. The identifier may indicate that the sender is the forwarding device (rather than the originator of the message, which is the remote controller). The message may further include a payload that includes one or more networking protocol instructions.

The message may be encapsulated to form an encapsulating message. The encapsulating message may include the encapsulated message as a payload, and may specify a sending address from the remote controller. The sending address may be used to designate a single remote controller, or a plurality of remote controllers (thereby allowing for redundancy in the network). If one of the plurality of remote controllers ceases communication with the forwarding device, another of the plurality of remote controllers may send networking protocol instructions to the forwarding device instead.

The encapsulating message may be sent to the forwarding device. Once received at the forwarding device, the encapsulating message may be deencapsulated to extract the original networking protocol message. The original networking protocol message may specify a destination device as a recipient and the forwarding device as the sender. The original networking protocol message may be sent from the forwarding device to the destination device. Accordingly, the destination device receives the networking protocol message in a manner that makes it appear as if the networking protocol message originated at the forwarding device, rather than the remote controller. Therefore, embodiments described herein may be employed in an existing network without needing to make changes to the operations of the network.

The forwarding device may also receive networking protocol messages from service devices on behalf of the remote controller. For example, a second message prepared according to the networking protocol may be received by the forwarding device. The second message may include an address designating the sender of the second message as the service device. The forwarding device may forward the second message to the remote controller for further processing according to the networking protocol. The message may be sent to the remote controller using a tunnel created according to a tunneling protocol.

In some embodiments, the forwarding device may not be preprogrammed with instructions for communicating with the remote controller (such as through the tunnel). Accordingly, the remote controller may directly contact the forwarding device. The remote controller may directly program the forwarding device with instructions related to the tunnel.

Exemplary embodiments may be implemented as instructions stored on a non-transitory electronic device-readable medium, as a method performed in an electronic device, or a system including a memory and a processor.

BRIEF DESCRIPTION OF THE DRAWINGS

FIG. 7 depicts an exemplary distributed environment suitable for practicing exemplary embodiments described herein.

DETAILED DESCRIPTION

Figure 1:
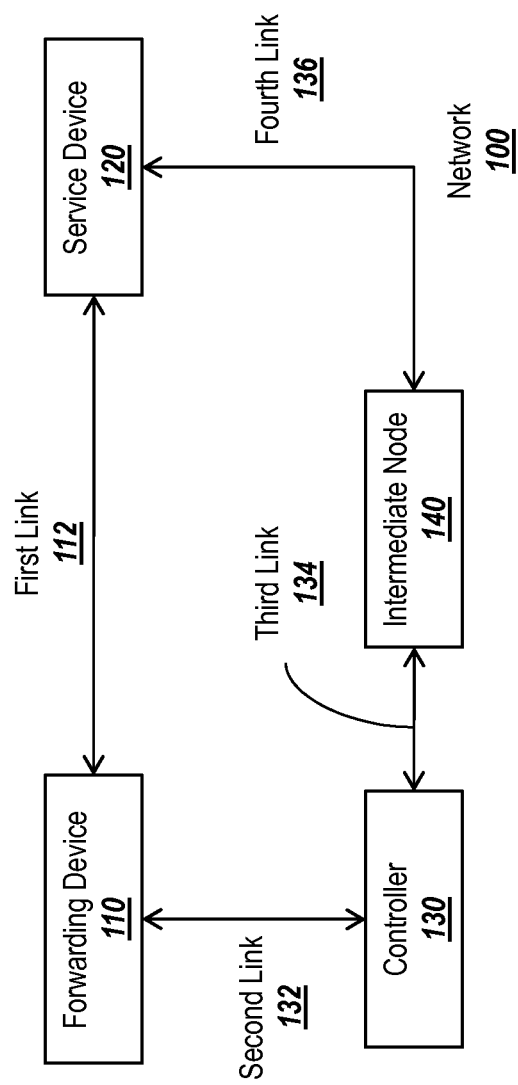
FIG. 1 depicts an exemplary network 100 using a remote controller 130 to implement or support a networking protocol according to exemplary embodiments described herein.

Exemplary embodiments described herein address a number of issues related to implementing or supporting a networking protocol directly in a forwarding device. For example, because (conventionally) a networking protocol is built into a forwarding device, it may be difficult to perform updates to software related to the networking protocol. If the forwarding device is to be updated to use a new version of the networking protocol (or a different networking protocol), the forwarding device may need to be temporarily shut down in order to implement the update. This period of inoperability may negatively impact traffic flowing through the network, because the routing device cannot be reached while the update is being implemented. Accordingly, assuming that a suitable detour exists, network traffic must be detoured around the inoperable forwarding device, increasing network latency and burdening other forwarding devices. If no suitable detour exists, information may not be able to be transmitted in the network until the forwarding device is brought online.

A similar problem occurs if logic for implementing the networking protocol causes the forwarding device to crash. In this situation, information traveling through the network must be either detoured or lost until the problem with the forwarding device can be resolved.

Furthermore, the forwarding device must have sufficient resources to implement the networking protocol. A forwarding device that is only responsible for accepting information and forwarding the information to a specified destination can be relatively simple. However, implementing the networking protocol at the forwarding device requires that the forwarding device have sufficient memory resources for storing programming related to the networking protocol, and the processing power for making routing decisions according to the networking protocol. Thus, a forwarding device implementing a networking protocol is more complex and expensive than a forwarding device that simply forwards messages.

Exemplary embodiments described herein remove the implementation of the networking protocol from the forwarding device. Responsibility for implementing the networking protocol is instead moved to a remote controller device. Accordingly, a relatively simple hardware device may be employed as the forwarding device. The forwarding device may be limited to particular capabilities, such as deencapsulating GRE packets (e.g., the forwarding device may serve as a tunnel endpoint for a GRE protocol tunnel).

The remote controller described herein may implement the networking protocol which would conventionally be implemented on the forwarding device. This may be accomplished, for example, by causing the remote controller to send GRE-encapsulated packets to the forwarding device. The forwarding device may deencapsulate the packets and send the deencapsulated packets to an intended destination. In the reverse direction, the forwarding device may encapsulate received packets using GRE and forward the encapsulated packets to the remote controller. Accordingly, the remote controller can act as though it were the forwarding device, and nearby devices need not be made aware of the presence of the remote controller in order to function.

Advantageously, because the implementation of the networking protocol is no longer present on the forwarding device, the forwarding device can be made simpler, less expensive, and more reliable.

For example, using the exemplary embodiments described herein, the networking protocol may employ more complex algorithms. Using the exemplary embodiments, the remote controller may be implemented as a server or a cluster of servers, which may be possess more processing power than the forwarding device. Thus, more complex networking algorithms can be used, which improves network usage, optimization, and costs over a conventional network (which implements the networking protocol at a less powerful network appliance such as the forwarding device).

Further, the remote controller can easily make networking decisions based on the global state of the network or based on information received by other systems in the network. Conventional protocols such as BGP, combined with the limited processing power of conventional forwarding devices, generally require that decisions are made based solely on local information (e.g., network links directly connected to the forwarding device).

Furthermore, when an update is made to logic implementing the networking protocol, a secondary remote controller may be swapped in to handle routing of the information until the primary remote controller can be brought back online. Thus, the forwarding device may continue to forward messages according to the networking protocol without interruption during the upgrade process.

Still further, multiple controllers may be used to implement the networking protocol for a forwarding device. Thus, if one of the controllers crashes or is otherwise taken offline, the other controllers can continue to implement the networking protocol for the forwarding device. Thus, information may be routed in the network without interruption.

As noted above, the networking protocol may be moved from the forwarding device to the remote controller. An exemplary network 100 including a forwarding device 110, a service device 120, and a remote controller 130 is depicted in FIG. 1.

The forwarding device 110 may be any device suitable for forwarding and/or routing information in the network 100. For example, the forwarding device 110 may be a router, a switch, or a custom device. The forwarding device 110 may receive messages from a source device at an input port and transmit outgoing messages towards a destination device from an output port.

The forwarding device 110 may be connected to the service device 120 through a first link 112. The first link 112 may be any medium suitable for transmitting information in the network. For example, the link may be an electrical transmission medium such as copper wire, an optical transmission medium such as a fiber optic cable, or a radio transmission medium such as radio signals traveling through the air, among other possibilities.

The service device 120 may be any device communicating in the network 100. Examples of service devices 120 include servers, such as email servers or web servers, personal computers, custom hardware devices, other forwarding devices, or other electronic devices which transmit and/or receive information in the network 100.

In a conventional network, the forwarding device 110 may be programmed with logic implementing a networking protocol. The forwarding device 110 may exchange messages with the service device 120 over the first link 112 in order to instruct the service device 120 as to how to communicate in the network. For example, the forwarding device 110 might provide routing information to the service device 120. In exemplary embodiments described herein, this responsibility may be moved from the forwarding device 110 to the remote controller 130.

The remote controller 130 may be any device suitable for implementing or supporting the networking protocol, making decisions according to the networking protocol, and/or formulating networking protocol messages for informing other devices how to communicate in the network 100. For example, the remote controller 130 may be a personal computer, a server, a router, a switch, or a custom electronic device.

The remote controller 130 may be programmed with logic for implementing the networking protocol. Because the networking protocol logic resides on the remote controller 130 (rather than the forwarding device 110), the forwarding device 110 may be made simpler. For example, the forwarding device 110 may not require memory resources or processing resources that would otherwise be required to implement the networking protocol. Furthermore, if an update is made to the networking protocol, the update may be effected by swapping an alternative remote controller 130 for the original remote controller 130, thus allowing the update to be performed without degrading the ability of networking protocol messages to be generated and sent in the network 100. Still further, redundant remote controllers 130 may be provided so that a failure at a single point in the network 100 does not cause a cessation of all networking protocol messages, as may happen if the networking protocol logic is concentrated at the forwarding device 110.

In some embodiments, the remote controller 130 may not implement the networking protocol directly, but rather may support the networking protocol. For example, the remote controller 130 may employ or interpret messages and instructions that comply with the networking protocol.

The remote controller 130 may communicate with the forwarding device 110 using a second link 132. The second link 132 may be similar to the first link 112, or may be a different type of medium than the first link 112.

FIG. 1 illustrates one potential problem involved in moving the networking protocol away from the forwarding device 110 and onto the remote controller 130. The problem arises from the presence of a second path through the network, originating at the remote controller 130, ending at the service device 120, and passing through the intermediate node 140.

The intermediate node 140 may be any device in the network, such as a router, switch, server, or custom device. The remote controller 130 may reach the service device 120 through the intermediate node 140 using a third link 134 and a fourth link 136. Because the remote controller 130 can reach the service device 120 over the third link 134 and the fourth link 136, networking protocol messages from the remote controller 130 to the service device 120 do not necessarily travel over the first link 112.

In the conventional configuration, the forwarding device 110 is responsible for both sending networking protocol messages to the service device 120 and for forwarding messages between different parts of the network. Thus, if the first link 112 becomes inoperable (e.g., because a cable has been unplugged, because a device located on the first link 112 has failed, or due to other problems on the first link 112), the forwarding device 110 becomes aware of the situation (e.g., due to the presence of dropped messages) and can take corrective action. Such corrective action may include using the networking protocol to define an alternative path through the network 100 through which information can be routed. The forwarding device 110 may also inform network administrators of the problem with the first link 112.

Although the networking protocol may be removed from the forwarding device 110 in exemplary embodiments, responsibility for forwarding information in the network 100 remains at the forwarding device 110. This establishes a dichotomy in responsibilities so that problems related to forwarding the information in the network may be unknown to the remote controller 130 that is responsible (via the networking protocol) for determining and/or defining routes through the network.

For example, consider the situation in which the first link 112, which the forwarding device 110 is relying upon to forward information in the network, becomes inoperable. As noted above, the remote controller 130 is connected to the service device 120 along a second path passing through the intermediate node 140 but not passing through the first link 112. Thus, the remote controller 130 (which is responsible for making routing decisions) may be unaware of the problem in the first link 112 because the remote controller 130 does not observe any problematic behavior (such as dropped packets).

Thus, problems in the first link 112 may remain unseen by the remote controller 130, which therefore will not take corrective action to resolve such problems. Accordingly, the forwarding device 110 may continue to attempt to route traffic over the now inoperable first link 112 (since routing decisions may be made by the remote controller 130, instead of the forwarding device 110), causing repeated information loss and connectivity problems in the network.

Figure 2:
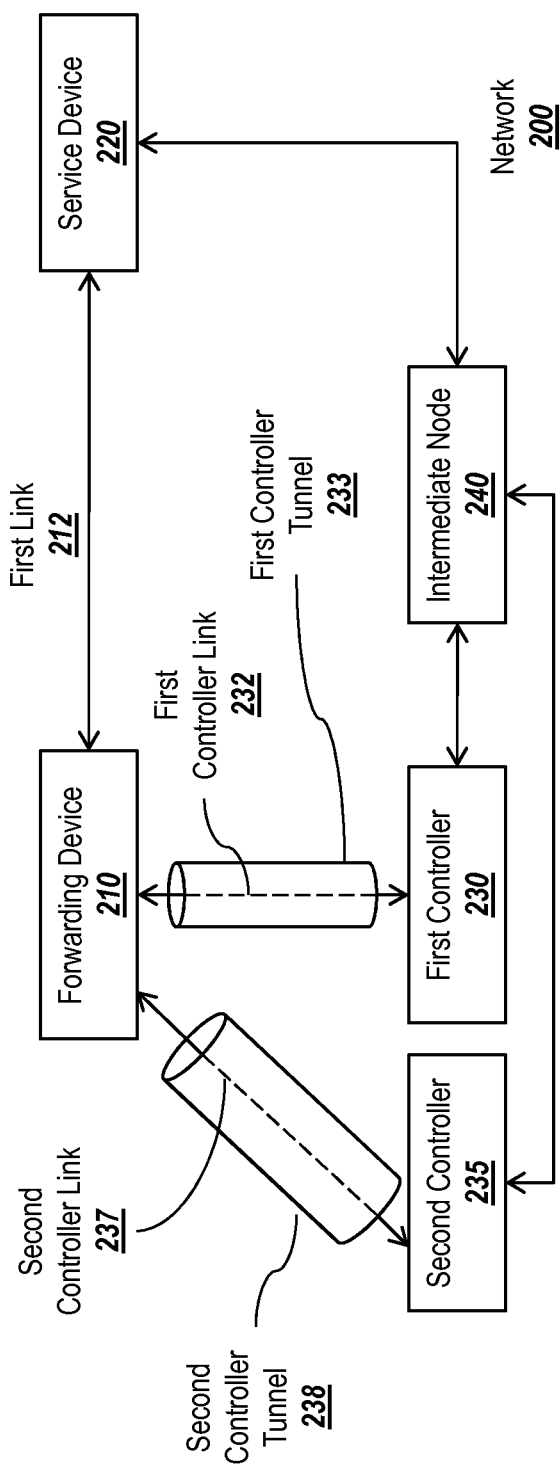
FIG. 2 depicts another exemplary network 200 using a plurality of remote controllers 230, 235 and a plurality of tunnels 233, 238 to implement the networking protocol according to exemplary embodiments described herein.

A solution to this problem is depicted in FIG. 2. In the network 200, a forwarding device 210 communicates with a service device 220 via a first link 212. A first remote controller 230, and a second remote controller 235, communicate with the forwarding device 210 via a first controller link 232 and a second controller link 237, respectively. The first remote controller 230 and the second remote controller 235 may each independently implement logic describing a networking protocol. The first remote controller 230 and the second remote controller 235 may each be designated by the same address, so that networking protocol messages from the forwarding device are received by both remote controllers. The remote controllers may designate one of the remote controllers as a primary remote controller which is responsible for enforcing the networking protocol on the network. If the primary remote controller is taken offline (e.g., due to an error or an upgrade), one of the other remote controllers may become the primary remote controller.

By using two remote controllers 230, 235, redundancy is established in the case of a failure by one of the remote controllers 230, 235. Furthermore, one of the remote controllers 230, 235 can be taken offline (e.g., in order to upgrade the controller) without negatively impacting the generation or transmission of networking protocol messages. Although two remote controllers are shown in FIG. 2, more remote controllers may also be employed.

The first remote controller 230 and the second remote controller 235 are each capable of communicating with the service device 220 either through the forwarding device 210, or through the intermediate node 240.

In the embodiment depicted in FIG. 2, the first remote controller 230 communicates with the forwarding device 210 using a first controller tunnel 233. Similarly, the second remote controller 235 communicates with the forwarding device 210 using a second controller tunnel 238. A tunnel is a logical connection between devices. A tunnel may be described by a tunneling protocol that defines how messages are passed between the devices. The tunneling protocol may override other network communication protocols employed by the network 200. The tunnel thus provides a common medium for communication between the devices, which can be used to span otherwise incompatible networks. Examples of tunneling protocols include the Generic Routing Encapsulation (GRE) tunneling protocol and the Transmission Control Protocol (TCP) tunneling protocol, among others.

Using the tunnels 233, 238, messages can be sent to the service device 220 in a manner that enables the controllers 230, 235 to be made aware of problems in the network 220. As will be described in more detail with respect to FIGS. 4, 5A, and 5B, the first remote controller 230 may generate a networking protocol message that addressed to the service device 220 (the "recipient" of the message). The networking protocol message may also designate a sender of the message. In this case, although the message is generated by the first remote controller 230, the first remote controller 230 may designate the forwarding device 210 as the sender of the message. The first remote controller 230 may then encapsulate the networking protocol message (the "encapsulated message") in a second message (the "encapsulating message"). The encapsulating message may indicate that the first remote controller 230 is the sender of the message.

Encapsulation is the process of wrapping information with other information. For example, a first message may include administrative header information (such as the sender receiver of the message) and a payload (the contents of the message). The first message may be encapsulated by taking the message (including the header information and the payload) and representing the message as the payload of a second message. The second message may have different administrative header information. The second message may then be transmitted to a destination defined by the second message's administrative header information. When received at the destination, the message may be deencapsulated by extracting the payload (the first message). The first message may then be processed, for example by forwarding the first message to the destination indicated by the administrative header information of the first message.

Encapsulation may be used, for example, to change the format of a message by wrapping the message in a second message of a different format. Encapsulation is therefore useful in applications employing tunneling: a first message may be written in a format required by the network 200 and encapsulated in a second message that is compatible with the format employed by the tunnel 233. The second message may be transmitted over the tunnel 233 and deencapsulated to extract the first message. The first message may then be sent over the first link 212 according to the format required by the network 200. Encapsulation is described in more detail with respect to FIG. 3, below.

The networking protocol message may be encapsulated and sent over the tunnel 233 to the forwarding device 210. At the forwarding device 210, the encapsulating message is recognized, deencapsulated to extract the original networking protocol message, and examined to determine the destination of the original networking protocol message. The forwarding device 210 then forwards the original networking protocol message to the destination (the service device 220) in the same manner as if the networking protocol message had originated at the forwarding device (rather than the first remote controller).

Thus, the first remote controller 230 is able to cause the networking protocol message to follow the same path through the network as the messages that are transmitted by the forwarding device 210. Therefore, the networking protocol message passes through the first link 212. If the networking protocol message does not reach its destination (the service device 220) due to a problem on the first link 212, the first remote controller is made aware of the failure and can take action to correct the problem, such as instructing the forwarding device to use a different path through the network to forward traffic to the service device 220.

Although this example is described with respect to the first remote controller 230 and the first controller tunnel 233, these steps may equally be employed by the second remote controller 235 or another remote controller present in the network 200.

Figure 3:
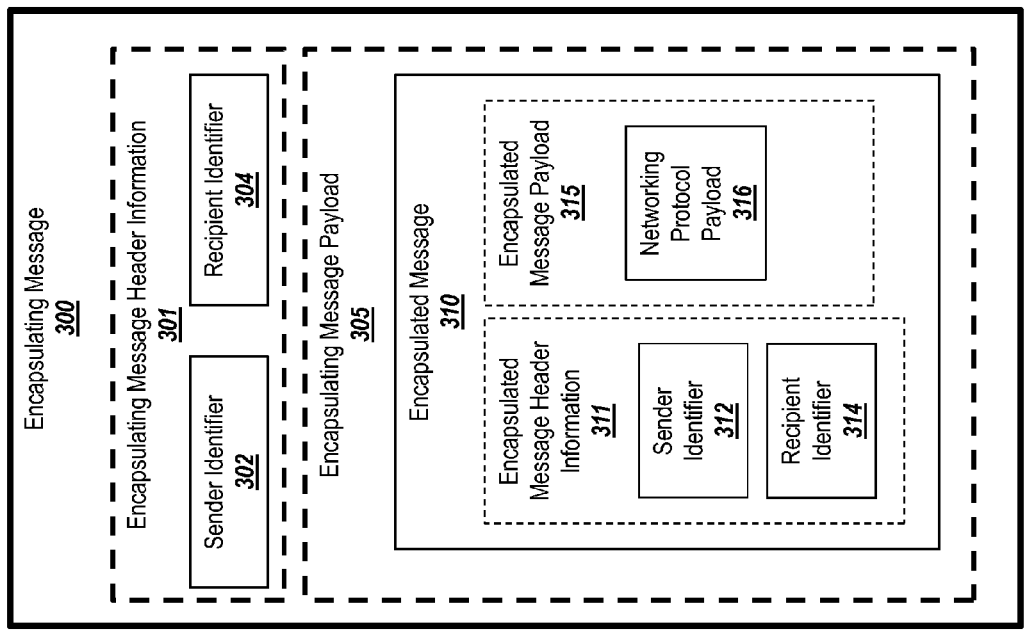
FIG. 3 depicts an exemplary message format for messages sent by the remote controllers.

FIG. 3 depicts an exemplary message format for the encapsulating message 300 and encapsulated message 310 described above. Using the format described below, the remote controller may first generate a networking protocol message which is intended to appear as if the networking protocol message originated at the forwarding device. The networking protocol message (encapsulated message 310) may then be encapsulated in an encapsulating message 300 that is sent from the remote controller to the forwarding device over the tunnel. The forwarding device may then deencapsulated the encapsulating message 300 to extract the original networking protocol message. The networking protocol message may then be forwarded to the service device as if the networking protocol message had originated at the forwarding device.

The encapsulating message 300 may include encapsulating message header information 301. The encapsulating message header information 301 may include a sender identifier 302 that identifies the sender of the encapsulating message 300. In the encapsulating message 300, the sender identifier 302 may designate the remote controller as the sender of the encapsulating message 300. The encapsulating message header information 301 may further include a recipient identifier 304 that identifies the intended destination of the encapsulating message 300. The recipient identifier 304 may designate the forwarding device as the recipient of the encapsulating message 300. The recipient identifier 304 for the encapsulating message 300 may designate the forwarding device as the recipient of the encapsulating message 300.

The encapsulating message 300 may further include an encapsulating message payload 305. The encapsulating message payload 305 includes the contents of the encapsulating message, which in this case may be the encapsulated message 310. The encapsulated message 310 may be a networking protocol message formatted according to the networking protocol.

The encapsulated message 310 may include encapsulated message header information 311 that specifies administrative meta-information about the encapsulated message 310. For example, the encapsulated message header information 311 may include a sender identifier 312 that is meant to identify the sender of the encapsulated message 310. The sender identifier 312 may identify the forwarding device as the sender of the encapsulated message 310 (even though the encapsulated message 310 may have been generated by the remote controller and not the forwarding device). The encapsulated message header information 311 may further include a recipient identifier 314 that identifies the intended destination of the encapsulated message 310. The recipient identifier 314 may identify the service device as the recipient of the encapsulated message.

The encapsulated message 310 may further include an encapsulated message payload 315. The encapsulated message payload 315 includes the contents of the encapsulated message 310. For example, the encapsulated message payload 315 may include a networking protocol payload 316. The networking protocol payload 316 may include one or more instructions for implementing the networking protocol by the service device. The instructions may be generated by the remote controller according to the networking protocol.

The encapsulating message 300 and the encapsulated message 310 may be in different formats. For example, the encapsulating message 300 may be formatted according to the tunneling protocol defining the tunnel between the remote controller and the forwarding device. The encapsulated message 310 may be formatted according to a networking protocol for communicating in the network connecting the forwarding device to the service device.

Generally, the remote controller may generate the encapsulated message 310 by creating one or more networking protocol instructions according to the networking protocol, which is programmed into the remote controller. The remote controller may encapsulate the encapsulated message 310 in the encapsulating message 300 and forward the encapsulating message 300 to the forwarding device. Upon receiving the encapsulating message 300, the forwarding device may deencapsulated the encapsulating message 300 to extract the encapsulated message 310 including the networking protocol instructions. The forwarding device may then forward the encapsulated message 310 to the service device. Because the remote controller designated the sender identifier 312 of the encapsulated message 310 as belonging to the forwarding device, it will appear to the service device that the forwarding device is responsible for implementing the networking protocol. This process is described in more detail below with respect to FIGS. 4, 5A, and 5B.

Figure 4:
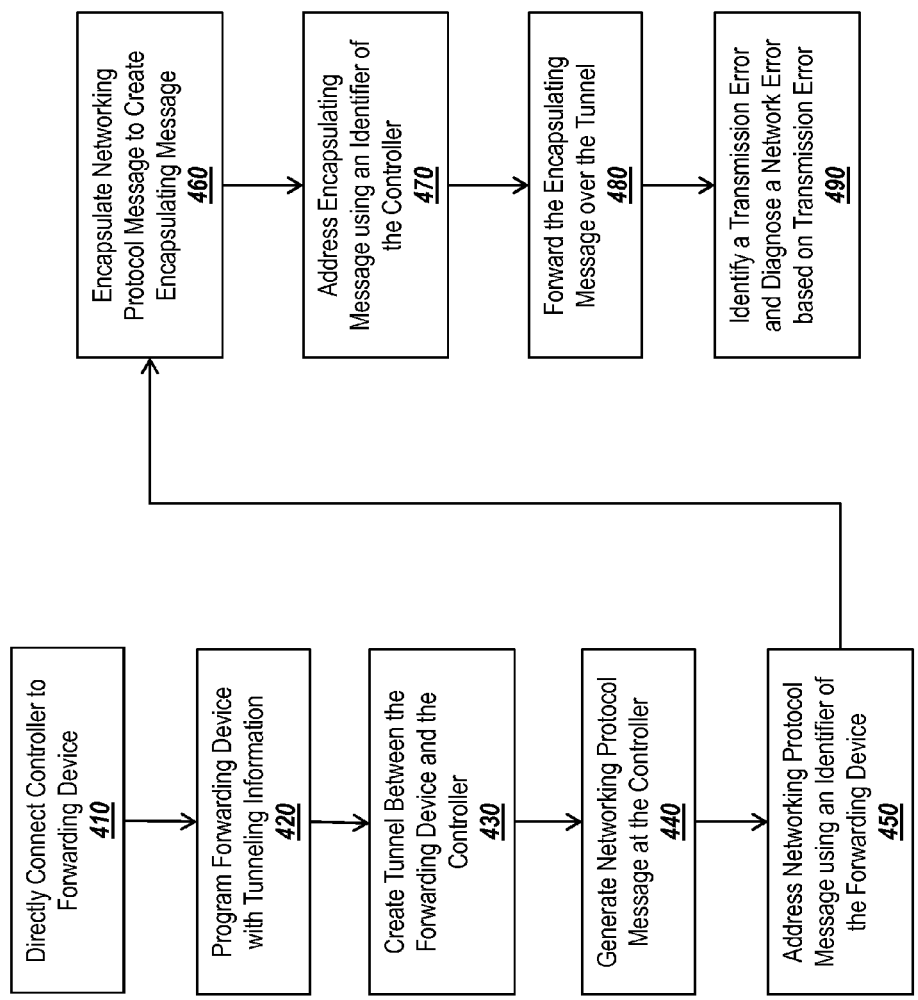
FIG. 4 is a flowchart depicting exemplary steps employed by the remote controller for implementing and/or enforcing the networking protocol according to exemplary embodiments.

FIG. 4 is a flowchart of steps that may be performed by the remote controller. Initially, the forwarding device may be programmed only for forwarding functionality, and may not understand how to identify, receive, and forward networking protocol messages from the remote controller. Accordingly, at step 410, the remote controller may connect to the forwarding device directly. For example, the remote controller may initiate a connection to the forwarding device on a specified port that can be used to program the forwarding device.

At step 420, the remote controller may program the forwarding device using the direct connection created at step 410. The remote controller may access the forwarding device's logic for handling different types of messages, and add instructions for handling messages from the remote controller.

The instructions may cause the forwarding device to (for example) recognize a message from the remote controller as a message that receives special handling. The instructions may include instructions for recognizing such a message based on the sender of the message (a remote controller) or based on one or more flags in the header information of the message, such as the presence of a networking protocol message flag that indicates that the message includes instructions according to the networking protocol. Such a networking protocol message flag may be present in the encapsulating message header information 301. The message may further be recognized based on the contents of the message, such as by recognizing instructions (e.g., formatted according to the networking protocol) included in the networking protocol payload 316. The message may also be recognized based on a port on which the message arrives, the use of a tunnel to deliver the message, or the overall formatting of the message, among other possibilities.

The instructions may further include instructions for deencapsulating the encapsulating message 300 to extract the encapsulated message 310. The instructions may also include instructions for checking the recipient identifier 314 of the encapsulated message 310 and forwarding the encapsulated message 310 to the designated recipient.

Furthermore, the instructions may include instructions for handling networking protocol messages that originate at a service device and that are addressed to the forwarding device. These messages may be identified, for example based on a networking protocol flag in the header of the message or based on the contents of the message, as described above. Because the forwarding device may not be programmed with the logic necessary for implementing the networking protocol, the instructions may cause the forwarding device to forward any networking protocol messages to the remote controller for further processing.

Still further, the instructions may include instructions for diagnosing errors in the network that may be used to route data according to the networking protocol. For example, if a networking protocol message, or any other network traffic, fails to reach its destination (e.g., no acknowledgement of the receipt of the networking protocol message is received by the forwarding device within a certain period of time), the instructions may cause the forwarding device to report the failure to the remote controller so that corrective action can be taken based on the failure.

Accordingly, the forwarding device, which may not have originally been programmed to handle networking protocol messages, may be programmed in step 420 to act as a proxy for the remote controller for the transmission and receipt of networking protocol messages. Steps 430-490 describe such a transmission sequence.

At step 430, the remote controller may create a tunnel to the forwarding device for communicating networking protocol messages to the forwarding device. The tunnel may be, for example, a GRE tunnel. The tunnel may be created according to tunneling protocol logic, as described in more detail above with respect to FIG. 2 and below with respect to FIG. 6.

At step 440, the remote controller may generate a networking protocol message. The networking protocol message may be, for example, the encapsulated message 310 described above with respect to FIG. 3. At step 450, the networking protocol message may be populated with addressing information. The addressing information may designate the service device (which is meant to receive the networking protocol instructions in the networking protocol message) as the recipient of the message.

The addressing information may further designate the forwarding device as the sender of the message. Accordingly, when the service device eventually receives the networking protocol message, it appears as though the networking protocol message originated from the forwarding device. Therefore, responses to the networking protocol message will be sent from the service device to the forwarding device, which provides several advantages. For example, these responses will travel to the forwarding device using the same links used by the network traffic that otherwise is forwarded by the forwarding device. This allows network errors to be quickly diagnosed. Furthermore, the handling of networking protocol messages, from the perspective of the service device, appears to be the same as in a traditional network (even though the networking protocol messages are actually being handled by the remote controller). Accordingly, no changes need to be made to network devices in order to implement the embodiments described herein.

At step 460, the networking protocol message may be encapsulated to create an encapsulating message. The encapsulating message may be, for example, the encapsulating message 300 described above with respect to FIG. 3.

At step 470, the encapsulating message may be addressed with addressing information. The addressing information may include an intended recipient of the encapsulating message, which in this case may be the forwarding device. The addressing information may further include a sender of the encapsulating message, which in this case may be the remote controller.

At step 480, the encapsulating message may be sent towards the forwarding device using the tunnel created in step 430. The remote controller may then await a response from the forwarding device. If the message has been properly received and implemented by the intended recipient (e.g., the service device), then no further action needs to be taken. However, if the message is not properly received and/or implemented by the intended recipient, then a transmission error in the network may be identified and diagnosed. For example, if the message could not be transmitted to the intended recipient (e.g., due to a problem on one or more of the links connecting the forwarding device to the service device), then an alternate route that does not use the faulty link may be devised by the remote controller. The remote controller may then instruct the forwarding device, the service device, and/or other devices in the network to use the alternate route.

Once the encapsulating message has been sent, the remote controller may choose to either maintain the tunnel connection to the forwarding device (to eliminate the overhead of creating new tunnels to the forwarding device in the future), or tear down the tunnel (to free network resources).

The steps described in FIG. 4 (and FIGS. 5A and 5B, below) need not be performed in exactly the order specified. For example, some steps (e.g., steps 430 and 440) may be reversed, and some steps (e.g., steps 440 and 450) may be performed simultaneously.

Figure 5:
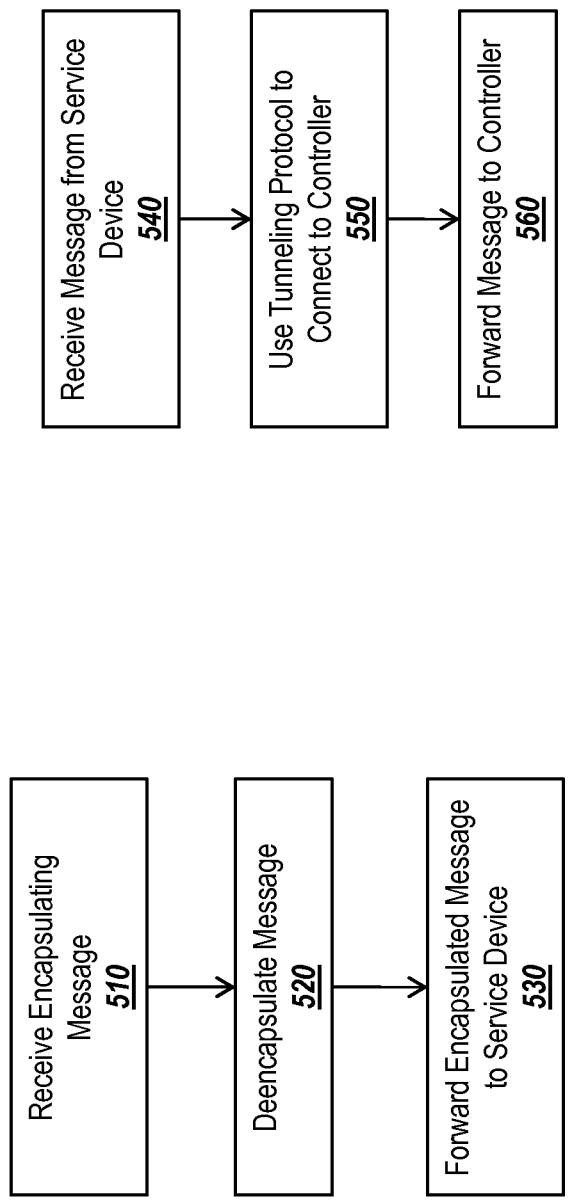
FIG. 5A is a flowchart depicting exemplary steps employed by a forwarding device for handling messages from the remote controller(s).
FIG. 5B is a flowchart depicting exemplary steps employed by a forwarding device for handling networking protocol messages from service device(s) in the network.

Once the encapsulating message is received by the forwarding device, the message may be processed as described in FIG. 5A.

At step 510, the encapsulating message may be received by the forwarding device. The forwarding device may recognize the encapsulating message as including networking protocol instructions using the logic programmed into the forwarding device at step 420 (see FIG. 4). Accordingly, at step 520, the forwarding device may deencapsulated the encapsulating message to extract the encapsulated networking protocol message. At step 530, the forwarding device may forward the encapsulated networking protocol message towards the recipient of the encapsulated networking protocol message (e.g., the service device) as designated by the recipient identifier of the networking protocol message.

In addition to forwarding the networking protocol message from the remote controller to the service device, the forwarding device may also receive networking protocol messages that are designated for the device that implements the networking protocol. From the perspective of the service device(s) in the network, the forwarding device is responsible for implementing the networking protocol (due to the "spoofing" of the forwarding device's identity as the sender of the networking protocol messages described above). Thus, the forwarding device may need to have the ability to recognize the networking protocol message and forward the networking protocol messages to the remote controller for processing according to the networking protocol.

Therefore, at step 540, a networking protocol message may be received from the service device. The networking protocol message may be recognized based on the instructions programmed into the forwarding device at step 430 (see FIG. 4). Accordingly, at step 550, the forwarding device may use the tunneling protocol to connect to the remote controller. This may be accomplished by establishing a new tunnel, or by using a preexisting tunnel (either one created by the forwarding device, or one created by the remote controller). At step 560, the networking protocol message may be forwarded to the remote controller over the tunnel for further processing by the remote controller.

Figure 6:
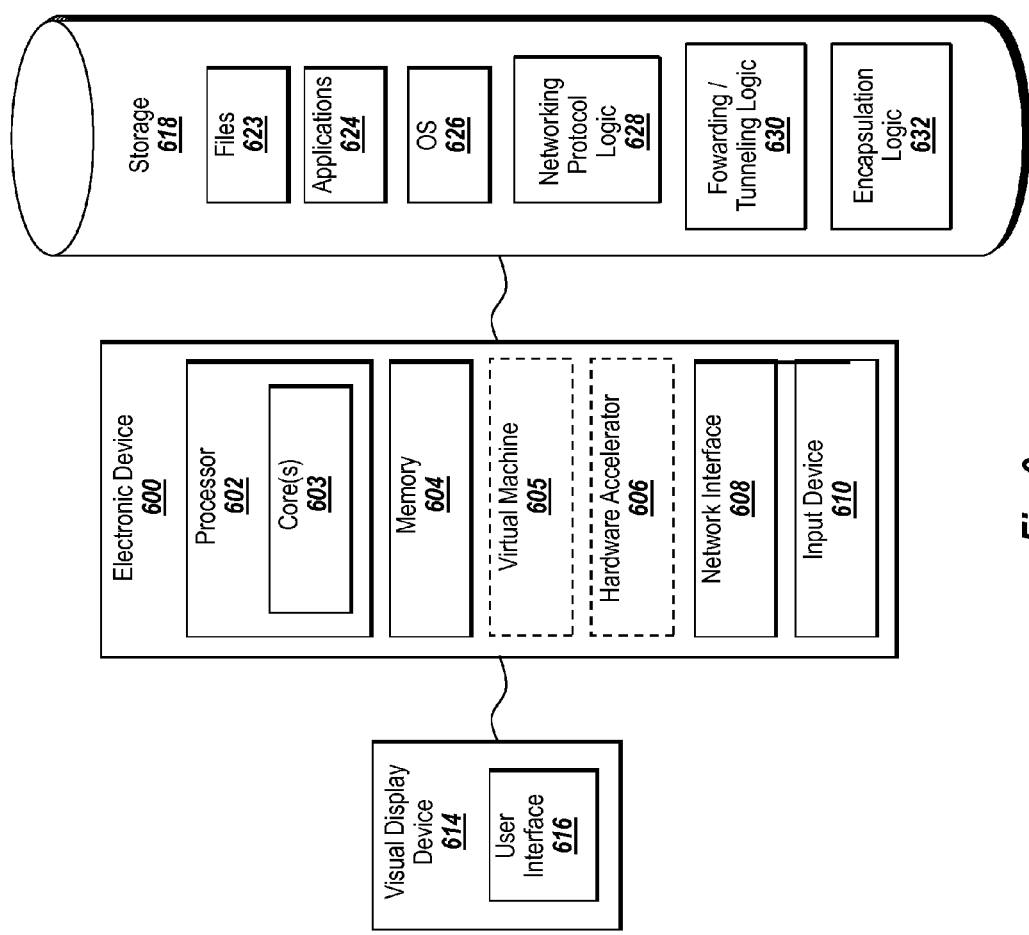
FIG. 6 depicts an exemplary electronic device 600 suitable for use with exemplary embodiments described herein.

One or more of the above-described acts may be encoded as computer-executable instructions executable by processing logic. The computer-executable instructions may be stored on one or more non-transitory computer readable media. One or more of the above described acts may be performed in a suitably-programmed electronic device. FIG. 6 depicts an example of an electronic device 600 that may be suitable for use with one or more acts disclosed herein.

The electronic device 600 may take many forms, including but not limited to a computer, workstation, server, network computer, quantum computer, optical computer, Internet appliance, mobile device, a pager, a tablet computer, a smart sensor, application specific processing device, etc.

The electronic device 600 is illustrative and may take other forms. For example, an alternative implementation of the electronic device 600 may have fewer components, more components, or components that are in a configuration that differs from the configuration of FIG. 6. The components of FIG. 6 and/or other figures described herein may be implemented using hardware based logic, software based logic and/or logic that is a combination of hardware and software based logic (e.g., hybrid logic); therefore, components illustrated in FIG. 6 and/or other figures are not limited to a specific type of logic.

The processor 602 may include hardware based logic or a combination of hardware based logic and software to execute instructions on behalf of the electronic device 600. The processor 602 may include logic that may interpret, execute, and/or otherwise process information contained in, for example, the memory 604. The information may include computer-executable instructions and/or data that may implement one or more embodiments of the invention. The processor 602 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor may include a single core or multiple cores 603. Moreover, the processor 602 may include a system-on-chip (SoC) or system-in-package (SiP).

The electronic device 600 may include one or more tangible non-transitory computer-readable storage media for storing one or more computer-executable instructions or software that may implement one or more embodiments of the invention. The non-transitory computer-readable storage media may be, for example, the memory 604 or the storage 618. The memory 604 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (FeRAM) devices, magneto-resistive RAM (MRAM) devices, phase change memory RAM (PRAM) devices, or other types of RAM devices.

One or more computing devices 600 may include a virtual machine (VM) 605 for executing the instructions loaded in the memory 604. A virtual machine 605 may be provided to handle a process running on multiple processors so that the process may appear to be using only one computing resource rather than multiple computing resources. Virtualization may be employed in the electronic device 600 so that infrastructure and resources in the electronic device may be shared dynamically. Multiple VMs 605 may be resident on a single computing device 600.

A hardware accelerator 606, may be implemented in an ASIC, FPGA, or some other device. The hardware accelerator 606 may be used to reduce the general processing time of the electronic device 600.

The electronic device 600 may include a network interface 608 to interface to a Local Area Network (LAN), Wide Area Network (WAN) or the Internet through a variety of connections including, but not limited to, standard telephone lines, LAN or WAN links (e.g., T1, T3, 56kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 608 may include a built-in network adapter, network interface card, personal computer memory card international association (PCMCIA) network card, card bus network adapter, wireless network adapter, universal serial bus (USB) network adapter, modem or any other device suitable for interfacing the electronic device 600 to any type of network capable of communication and performing the operations described herein.

The electronic device 600 may include one or more input devices 610, such as a keyboard, a multi-point touch interface, a pointing device (e.g., a mouse), a gyroscope, an accelerometer, a haptic device, a tactile device, a neural device, a microphone, or a camera that may be used to receive input from, for example, a user. Note that electronic device 600 may include other suitable I/O peripherals.

The input devices 610 may allow a user to provide input that is registered on a visual display device 614. A graphical user interface (GUI) 616 may be shown on the display device 614.

A storage device 618 may also be associated with the computer 600. The storage device 618 may be accessible to the processor 602 via an I/O bus. The information may be executed, interpreted, manipulated, and/or otherwise processed by the processor 602. The storage device 618 may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the invention The storage device 618 may further store applications 624, and the electronic device 600 can be running an operating system (OS) 626. Examples of OS 626 may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

The storage device 618 may further include networking protocol logic 628 for describing how messages in the network should be routed, formatted, or addressed. The networking protocol logic 628 may implemented, for example, the Border Gateway Protocol.

In addition to the networking protocol logic 628, the storage device 618 may store forwarding and/or tunneling logic 630. The forwarding and/or tunneling logic 630 may describe one or more techniques for forming a connection between two devices according to a tunneling protocol and/or a forwarding protocol. For example, the forwarding and/or tunneling logic may implement logic for creating a Generic Routing Encapsulation (GRE) tunnel, or a Transmission Control Protocol (TCP) tunnel.

Furthermore, the storage device 618 may store encapsulation logic 632 for encapsulating messages. The encapsulation logic 630 may encapsulate messages according to the encapsulation format described above with respect to FIG. 3. The encapsulation logic 632 may be distinct from, or may be a part of, the forwarding and/or tunneling logic 630.

One or more embodiments of the invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

FIG. 7 depicts a network implementation that may implement one or more embodiments of the invention. A system 700 may include a computing device 600, a network 712, a service provider 713, a target environment 714, and a cluster 715. The embodiment of FIG. 7 is exemplary, and other embodiments can include more devices, fewer devices, or devices in arrangements that differ from the arrangement of FIG. 7.

The network 712 may transport data from a source to a destination. Embodiments of the network 712 may use network devices, such as routers, switches, firewalls, and/or servers (not shown) and connections (e.g., links) to transport data. Data may refer to any type of machine-readable information having substantially any format that may be adapted for use in one or more networks and/or with one or more devices (e.g., the computing device 600, the service provider 713, etc.). Data may include digital information or analog information. Data may further be packetized and/or non-packetized.

The network 712 may be a hardwired network using wired conductors and/or optical fibers and/or may be a wireless network using free-space optical, radio frequency (RF), and/or acoustic transmission paths. In one implementation, the network 712 may be a substantially open public network, such as the Internet. In another implementation, the network 712 may be a more restricted network, such as a corporate virtual network. The network 712 may include Internet, intranet, Local Area Network (LAN), Wide Area Network (WAN), Metropolitan Area Network (MAN), wireless network (e.g., using IEEE 802.11), or other type of network The network 712 may use middleware, such as Common Object Request Broker Architecture (CORBA) or Distributed Component Object Model (DCOM). Implementations of networks and/or devices operating on networks described herein are not limited to, for example, any particular data type, protocol, and/or architecture/configuration.

The service provider 713 may include a device that makes a service available to another device. For example, the service provider 713 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

The server 714 may include a device that receives information over the network 712. For example, the server 714 may be a device that receives user input from the computer 600.

The cluster 715 may include a number of units of execution (UEs) 716 and may perform processing on behalf of the computer 600 and/or another device, such as the service provider 713 or server 714. For example, the cluster 715 may perform parallel processing on an operation received from the computer 600. The cluster 715 may include UEs 716 that reside on a single device or chip or that reside on a number of devices or chips.

The units of execution (UEs) 716 may include processing devices that perform operations on behalf of a device, such as a requesting device. A UE may be a microprocessor, field programmable gate array (FPGA), and/or another type of processing device. UE 716 may include code, such as code for an operating environment. For example, a UE may run a portion of an operating environment that pertains to parallel processing activities. The service provider 713 may operate the cluster 715 and may provide interactive optimization capabilities to the computer 600 on a subscription basis (e.g., via a web service).

Units of Execution (UEs) may provide remote/distributed processing capabilities for the applications 624. A hardware unit of execution may include a device (e.g., a hardware resource) that may perform and/or participate in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, a hardware unit of execution may include a single processing device that includes multiple cores or a number of processors. A hardware unit of execution may also be a programmable device, such as a field programmable gate array (FPGA), an application specific integrated circuit (ASIC), a digital signal processor (DSP), or other programmable device. Devices used in a hardware unit of execution may be arranged in many different configurations (or topologies), such as a grid, ring, star, or other configuration. A hardware unit of execution may support one or more threads (or processes) when performing processing operations.

A software unit of execution may include a software resource (e.g., a technical computing environment) that may perform and/or participate in one or more parallel programming activities. A software unit of execution may perform and/or participate in one or more parallel programming activities in response to a receipt of a program and/or one or more portions of the program. A software unit of execution may perform and/or participate in different types of parallel programming using one or more hardware units of execution. A software unit of execution may support one or more threads and/or processes when performing processing operations.

The term 'parallel programming' may be understood to include multiple types of parallel programming, e.g. task parallel programming, data parallel programming, and stream parallel programming. Parallel programming may include various types of processing that may be distributed across multiple resources (e.g., software units of execution, hardware units of execution, processors, microprocessors, clusters, labs) and may be performed at the same time.

For example, parallel programming may include task parallel programming where a number of tasks may be processed at the same time on a number of software units of execution. In task parallel programming, a task may be processed independently of other tasks executing, for example, at the same time.

Parallel programming may include data parallel programming, where data (e.g., a data set) may be parsed into a number of portions that may be executed in parallel using, for example, software units of execution. In data parallel programming, the software units of execution and/or the data portions may communicate with each other as processing progresses.

Parallel programming may include stream parallel programming (sometimes referred to as pipeline parallel programming). Stream parallel programming may use a number of software units of execution arranged, for example, in series (e.g., a line) where a first software unit of execution may produce a first result that may be fed to a second software unit of execution that may produce a second result given the first result. Stream parallel programming may also include a state where task allocation may be expressed in a directed acyclic graph (DAG) or a cyclic graph.

Other parallel programming techniques may involve some combination of task, data, and/or stream parallel programming techniques alone or with other types of processing techniques to form hybrid-parallel programming techniques.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. For example, the invention may be practiced without the use of an idle period analyzer 160 or without determining whether the system 110 is in an idle period. Thus, non-latency-sensitive requests may be divided into sub-requests and serviced without regard to whether an idle period is in effect. Alternatively, the idle period analyzer 160 could be used without splitting the non-latency-sensitive requests into sub-requests.

Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of an electronic device, unless otherwise stated.

It is intended that the invention not be limited to the particular embodiments disclosed above, but that the invention will include any and all particular embodiments and equivalents falling within the scope of the following appended claims.

The invention claimed is:

1. A non-transitory computer-readable medium storing instructions that, when executed by one or more processors, cause the one or more processors to:
   connect to a remote forwarding device separated from the one or more processors by at least one network link in a network;
   generate a message, the message relating to a networking protocol used in the network, the message including an identifier identifying a sender of the message, the identifier indicating that the sender of the message is the remote forwarding device;
   encapsulate the message to form an encapsulating message; and
   send the encapsulating message to the remote forwarding device via the at least one network link.

2. The medium of claim 1, further comprising instructions for:
   directly contacting the remote forwarding device; and
   directly programming the remote forwarding device with instructions related to the tunnel.

3. The medium of claim 1, wherein the remote forwarding device is not programmed to communicate using the networking protocol.

4. The medium of claim 1, wherein the networking protocol is Border Gateway Protocol (BGP).

5. The medium of claim 1, wherein connecting to the remote forwarding device comprises generating a tunnel to the remote forwarding device.

6. The medium of claim 5, wherein generating the tunnel is performed using tunneling logic, and the tunneling logic causes the message to follow a same path to a destination device as messages that originate at the remote forwarding device.

7. The medium of claim 6, further comprising instructions for:
   identifying a transmission error related to the sending of the encapsulating message; and
   diagnosing a network error based on the identifying.

8. An electronic device-implemented method comprising:
   receiving, by a forwarding device, a first message encapsulating a second message, the first message specifying a first sending address and the second message specifying a second sending address different from the first sending address, wherein the first sending address is of a remote controller and the second sending address is of the forwarding device, the encapsulated second message containing one or more networking protocol instructions;
   extracting the encapsulated second message from the encapsulating first message; and
   sending, by the forwarding device, the second message to a destination device.

9. The method of claim 8, wherein the first sending address identifies a plurality of remote controllers.

10. The method of claim 9, wherein one of the plurality of remote controllers ceases communication with the forwarding device, and another of the plurality of remote controllers sends networking protocol instructions to the forwarding device.

11. The method of claim 8, wherein the networking protocol instructions are described by a networking protocol, and further comprising:
   receiving a third message according to the networking protocol, the third message including a third sending address from a service device; and
   forwarding the third message to the remote controller.

12. The method of claim 11, wherein forwarding the third message comprises using a tunneling protocol to send the third message to the remote controller.

13. A system comprising: a memory for storing:
   connection logic for directly connecting to a forwarding device using a first connection,
   networking logic describing a networking protocol, and
   tunneling logic for communicating with the forwarding device; and a processor configured to:
    open a second connection to the forwarding device using the tunneling logic, the second connection comprising a tunnel, the second connection being distinct from the first connection,
    generate a first message encapsulating a second message according to the networking logic, the second message specifying an address of the forwarding device as a sending address and the second message describing a forwarding technique defined by the networking logic, and
    send the first message encapsulating the second message towards the forwarding device using the second connection.

14. The system of claim 13, wherein the processor is further configured to directly contact the forwarding device and program the forwarding device with instructions related to the tunnel.

15. The system of claim 13, wherein the forwarding device is not programmed to communicate using the networking protocol.

16. The system of claim 13, wherein the networking protocol is Border Gateway Protocol (BGP).

17. The system of claim 13, wherein generating the first message comprises encapsulating the second message.

18. The system of claim 13, wherein the tunneling logic causes the second message to follow a same path to a destination device as messages that originate at the remote forwarding device.

19. The system of claim 13, wherein the processor is further configured to:
    identify a transmission error related to the sending of the encapsulated second message; and
    diagnose a network error based on the identifying.

20. The system of claim 13, wherein the processor is further configured to receive a third message from a service device, the third message received via a tunnel created with the tunneling logic.

* * * * *